(12) United States Patent
Hoehne et al.

(10) Patent No.: US 11,341,760 B2
(45) Date of Patent: May 24, 2022

(54) FORM PROCESSING AND ANALYSIS SYSTEM

(71) Applicant: SAP SE, Walldorf (DE)

(72) Inventors: Johannes Hoehne, Berlin (DE); Konrad Schenk, Potsdam (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/007,704

(22) Filed: Aug. 31, 2020

(65) Prior Publication Data

US 2022/0067361 A1    Mar. 3, 2022

(51) Int. Cl.
*G06V 30/413* (2022.01)
*G06F 40/166* (2020.01)
*G06F 40/205* (2020.01)

(52) U.S. Cl.
CPC .......... *G06V 30/413* (2022.01); *G06F 40/166* (2020.01); *G06F 40/205* (2020.01)

(58) Field of Classification Search
CPC .................................................... G06F 40/166
See application file for complete search history.

(56) References Cited

U.S. PATENT DOCUMENTS

| | | | | |
|---|---|---|---|---|
| 5,595,655 A | * | 1/1997 | Steiner et al. | G06K 9/46 |
| 5,596,655 A | * | 1/1997 | Lopez | G06K 9/46 |
| 7,046,848 B1 | * | 5/2006 | Olcott | G06K 9/34 |
| 9,141,607 B1 | * | 9/2015 | Lee et al. | G06F 17/289 |
| 2017/0109424 A1 | * | 4/2017 | Oberhofer et al. | G06F 17/30598 |

* cited by examiner

*Primary Examiner* — James J Debrow
(74) *Attorney, Agent, or Firm* — Sterne, Kessler, Goldstein & Fox P.L.L.C.

(57) ABSTRACT

Disclosed herein are various embodiments for an augmented reality interaction, modeling, and annotation system. An embodiment operates by receiving an image including unknown data in an unknown format, including pixels. Each of the pixels is classified as one of a background pixel, a key pixel, or a value pixel representing the unknown data. For a plurality of the pixels classified as key pixels or value pixels, a plurality of locational data values associated with the unknown format are generated. Based on the locational data values, a key image and a corresponding value image from the received image are identified. The key image and the corresponding value image are output.

20 Claims, 7 Drawing Sheets

200

*Please fill out this form*

First Name Max

Last Name Mustermann

Address Beispielstr. 3

Berlin

ZIP 10829  City Berlin

Company Name: SAP SE

☒ I hereby allow to share my data 03.01.2019
Today's Date

Mustermann
Signature

*You may distribute this form!*

*Please fill out this form*

First Name Max

Last Name Mustermann

Address Beispielstr. 3

Berlin

ZIP 10829  City Berlin

Company Name: SAP SE

[X] I hereby allow to share my data 03.01.2019  Mustermann
Today's Date  Signature

*You may distribute this form*

Company Name
SAP SE

*Please fill out this form*

First Name: *Max*

Last Name: *Mustermann*

Address: Beispielstr. 3

*Berlin*

ZIP: *10829*

City: Berlin

[X] I hereby allow to share my data

Today's Date: *03.01.2019*

Signature: *Mustermann*

*You may distribute this form!*

FORM PROCESSING AND ANALYSIS SYSTEM

BACKGROUND

Businesses and other organizations often use forms to collect data about customers, prospective customers, and other business partners. The forms may include different information, with different formats, serve different purposes, and may occasionally be updated and changed. However the forms are only useful to the extent that the business can actually extract and use the data provided on the forms.

BRIEF DESCRIPTION OF THE DRAWINGS

The accompanying drawings are incorporated herein and form a part of the specification.

FIG. 2 is a block diagram of an example input form, according to some example embodiments.

FIG. 3 is a block diagram of an example pixelated input form, according to some example embodiments.

FIG. 4 is a block diagram illustrating examples of bounding boxes for key information and value information of an input form, according to some example embodiments.

FIG. 5 is a block diagram illustrating examples associations between key information and value information of an output form, according to some example embodiments.

In the drawings, like reference numbers generally indicate identical or similar elements. Additionally, generally, the left-most digit(s) of a reference number identifies the drawing in which the reference number first appears.

DETAILED DESCRIPTION

Businesses and other organizations often use forms to collect data about customers, prospective customers, and other business partners. The forms may include different information, with different formats, serve different purposes, and may occasionally be updated and changed. However, the forms are only useful to the extent that the business can actually extract and use the data provided on the forms.

Manual analysis of filled-out forms by an employee would require the employee to read and re-type or summarize all of the information from the form into a different format or program. This process is time consuming, expensive, and subject to mistakes by the employee. Further, the employee would have to learn about each different form being received.

Alternatively, a system may use templates to identify, classify, and/or extract data from forms. A template may be a pre-defined format that indicates what information is to be expected on the form, where on the form the various information is located. While the use of templates may increase reliability relative to manual analysis, creating templates for each form is a time consuming process.

For example, an employee may need to read, analyze and create templates for every single form being received, which takes time and is subject to employee errors. Then, a computing system would need to be directed as to which template is to be applied to which form. Furthermore, when a form is updated, the respective template has to be updated as well to reflect the changes to the form, otherwise errors could result. As the number of forms increase and updates to forms increase, the computing and resource overhead required to continue processing forms using templates also increases and may quickly become unsustainable.

Figure 1:
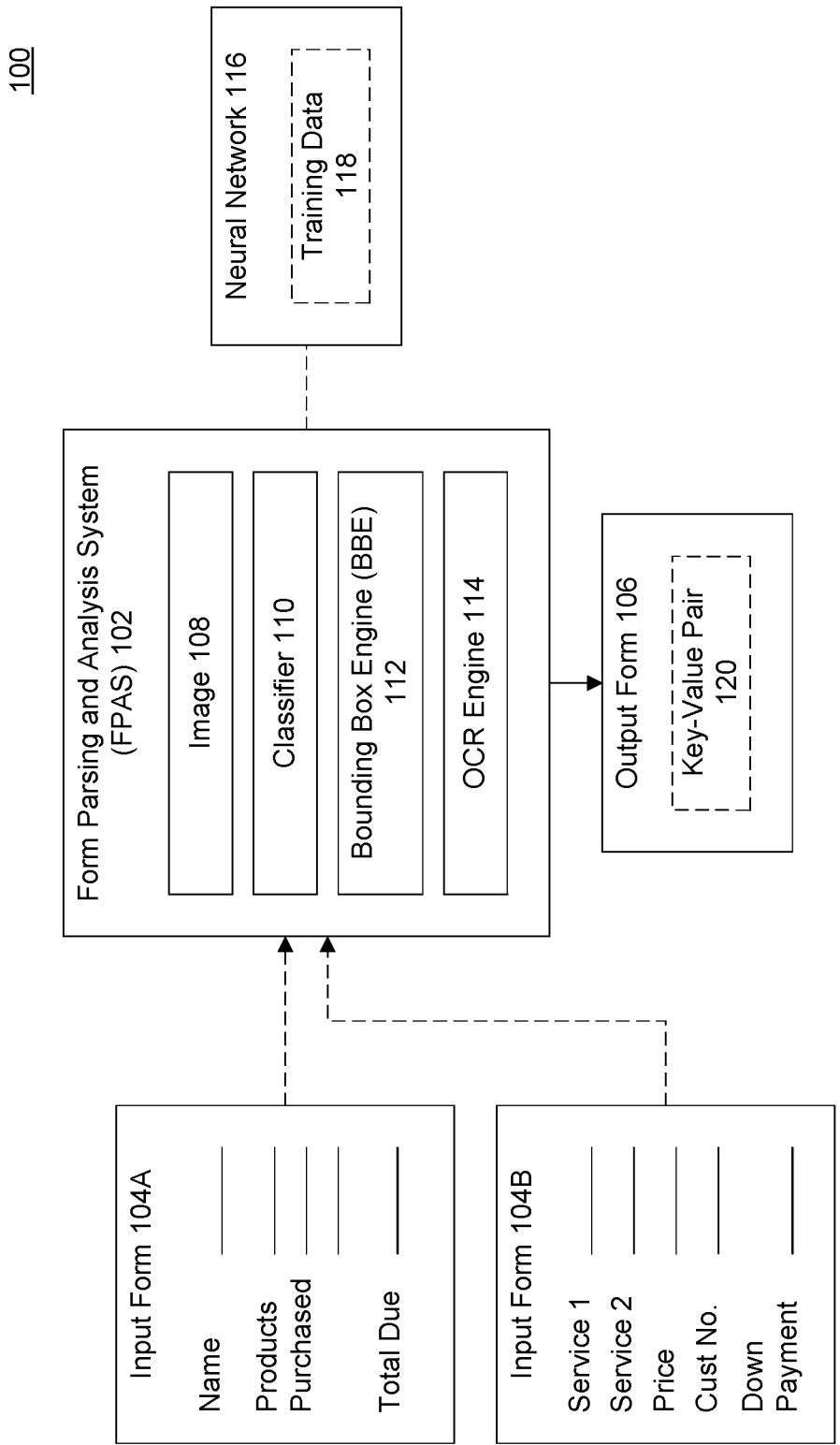
FIG. 1 is a block diagram of an example form processing and analysis system, according to some example embodiments.

FIG. 1 is a block diagram 100 of an example form processing and analysis system (FPAS) 102, according to some example embodiments. Rather than requiring the manual review of forms or the overhead and maintenance required with using templates, FPAS 102 may process, analyze, and extract data from forms 104A, 104B with either known or unknown formats, languages, and layouts.

A form 104A, 104B may be any medium by which one party requests information from another party. Example forms include shipping forms, purchase receipts, travel forms and documents, payment receipts, invoices, import/export forms, employee information forms, background information forms, legal documents, criminal or financial history forms, applications for employment, admissions, or grants or scholarships. The forms 104A, 104B may include handwritten or computer printed text across any number of different languages.

Each form 104A, 104B may include keys which may be pre-printed or preconfigured prompts for information that make up the form. The keys may be labels of the form used to identify the values filled in to the form by a person or computer. Each form 104A, 104B may also include values which may be responses to the keys. Some keys may not include values or may include blank or Null values if a user did not provide the requested information. The form may then be distributed to different systems or users. Those systems or users may then provide values in response to the keys. In an embodiment, FPAS 102 may identify, based on image processing or optical cues, the keys and corresponding values from an input image 108 of a form 104A, 104B.

While the keys may be identical across the same version of the form, the value information may vary depending on which user is filling out their information. Example keys for input form 104A include Name, Products Purchased, and Total Due. Example keys for input form 104B include Service 1, Service 2, Price, Cust. No. and Down Payment. The values may include any information provided in the blank spaces or lines near the keys, which may include either hand written and/or computer generated text or images, in any language. In an embodiment, the value information may be provided in multiple different languages on the same form 104A, 104B.

Each filled out input form 104A, 104B may be received by FPAS 102 as an image 108. Image 108 may be a picture, scan, or other multimedia image of the corresponding form with one or more values that have been filled out. In an embodiment, a stack of different forms may be fed into a scanner, and each form 104A, 104B may be received by FPAS 102 as an image 108 without any indication of what type of forms 104A, 104B are being received as images 108.

Rather than relying on manual processing or individual templates for each form 104A, 104B, FPAS 102 may use machine learning, deep learning, or neural network technology 116 to process and extract information from the images 108 corresponding to whatever forms 104A, 104B that are being input. Neural network 116 may include artificial intelligence technology that learns how to perform various processing tasks based on a set of training data 118.

The training data 118 may include various forms of different formats, with different keys, different fields, and even across different languages. In an embodiment, the training data 118 may include annotations or indications provided to neural network 116 distinguishing keys on the forms from values on the forms.

In an embodiment, the training data 118 may include examples of input and correct and/or incorrect outputs or classifications for what is expected to be produced by the neural network 116. With enough training data 118 the neural network 116 may learn how to identify keys and values from various forms, and may its ability to identify various objects from the forms 104A, 104B improve over time through processing and feedback. Once trained, neural network 116 may process an entire form image 108 in a single pass.

Rather than relying on textual analysis to perform the form processing described herein, FPAS 102 may identify keys and corresponding values or perform key-value extraction based on optical cues, such as object detection and layout information. For example, the proximity between information identified as a key, and information identified as a value, may be used to determine whether the identified key and identified value information comprise a key-value pair 120. The greater the proximity, or less the background or whitespace, the greater likelihood of being a key-value pair 120. Or, for example, key information may not include an underline but may be proximally located near value information which includes an underline or horizontal line.

While value information includes a horizontal line, which may be used by neural network 116 to identify key-value pairs 120. For example, the key "Products Purchased" may be proximally located near three blank lines which may be identified by neural network 116 as being a key-value pair 120. In other embodiments, different optical cues may be used by neural network 116 to identify keys, identify values, and identify key-value pairs 120.

Key-value pair 120 is an association made between two regions, objects, or sub-images of a form 104A, 104B that indicates there is a relationship between these two identified objects. For example, if form 104A included the name "Sam", then one key-value pair 120 may include "Name" (or the region of an image 108 identified as a key object including the Name text) as the key and "Sam" (or the region of an image 108 identified as a value object including the Sam text) as the value. As is discussed in greater detail below, FPAS 102 may not perform textual identification or processing in identified key-value pairs 120, but instead may do so based on optical cues, object identification, and image analysis.

In an embodiment, neural network 116 may produce two outputs: a segmentation mask and a float mask. In an embodiment, the segmentation mask may specify for each pixel (or a subset of pixels) of image 108, whether the pixel belongs to a key-object, value-object, or no object (e.g., background). The float mask may include six float values that specify a shape of an object bounding box (for a predicted or identified key or value object) as well as an offset value that indicates a distance to any semantically (or visually) connected or associated key object (which is primarily useful for value objects).

In an embodiment, neural network 116 may include a classifier 110 and a bounding box engine (BBE) 112. Classifier 110 may identify or categorize the pixels of an image 108 as being a background pixel, a key pixel, or a value pixel. A background pixel may be a pixel that corresponds to background area of a form. A key pixel may indicate a pixel that is within a predicted bounding box for key information of a form. A value pixel may indicate a pixel that is within a predicted bounding box for value information of a form.

Bounding box engine (BBE) 112 may predict or identify the various bounding boxes for the various objects or sub-images identified within image 108. For example, using image analysis or optical cues, BBE 112 may predict bounding boxes that differentiate between the different objects (keys and values) of an image 108. As noted above, the pixels within each bounding box may be identified as being either key pixels or value pixels. The pixel classification may then be applied to the various bounding boxes to identify key objects and value objects within image 108.

In an embodiment, FPAS 102 may identify the key information and value information from image 108 without first performing optical character recognition (OCR) or performing any other textual analysis. Instead, FPAS 102 may identify objects or sub-images within image 108 based on predicted object bounding boxes, and classify the objects as either key information and value information (or background). FPAS 102 may then output the identified and classified bounding boxes as key-value pairs 120 as part of output form 106, ignoring any objects which may have been identified as background.

FIG. 2 is a block diagram of an example input form 200, according to some example embodiments. As illustrated, the input form 200 may be received by FPAS 102 as an image 108. Input form 200 includes various key information and filled-in value information. The key information may include the objects that read: First Name, Last Name, Company Name, Address, Zip, City, Today's Date, Signature, and "I hereby allow to share my data".

The value information of form 200 may be whatever information is provided in physical, spatial, or optical proximity to the identified key information. For example, the value information for Company Name may be the object or sub-image that includes the text "SAP SE". As noted above, FPAS 102 may perform image processing without performing OCR, as such, the key and value information may be identified as those objects or portions of image 108 that include various shapes or figures identified as keys or values. However, FPAS 102 may have no knowledge as to the language or meaning of the text.

As illustrated, the value information may include a combination of handwriting, computer text, and different fonts. In an embodiment, the value information may also be provided in a plurality of different languages.

In an embodiment, BBE 112 may identify or generate a float mask including locational values, for at least a subset of pixels of image 108. As noted above, the locational values or float mask may indicate the relative position of a pixes to a corresponding key object and/or value object bounding box.

FIG. 3 is a block diagram of an example pixelated input form 300, according to some example embodiments. As illustrated, the pixelated input form 300 may illustrate how FPAS 102 may receive an image 108 of an input form 200, and may perform pixel analysis or processing on the various pixels of image 108.

Pixelated input form 300 illustrates one embodiment of how the image of form 200 may be divided into pixels. In another embodiment, the pixels may be of different or varying sizes. As described above, the classifier 110 of FPAS 102 (executing on neural network 116) may classify each pixel as being a background pixel, key pixel, or value pixel based on its analysis.

BBE 112 may generate bounding boxes for the pixels corresponding to various key and value objects identified within an image 108. As noted above, each bounding box may correspond to one of key information (e.g., a key object or key sub-image), or value information (e.g., a value object or value sub-image). In an embodiment, any pixels classified as being a background pixel (by classifier 110) may be ignored—in that no float mask or locational values or information is generated or recorded for those pixels. This may save processing resources and improves processing speeds.

FIG. 4 is a block diagram illustrating examples of bounding boxes for key information and value information of an input form 400, according to some example embodiments.

For various key or value pixels from pixelated input form 300 (which may be an image 108), FPAS 102 may generate one or more predicted bounding boxes that may be derived from or based on a float mask of values that indicate a location of that pixel relative to each of the one or more bounding boxes. In an embodiment, each pixel may be identified as being related to one key bounding box and/or one value bounding box. The illustrated bounding boxes may be the result of generating hundreds or thousands of intermediary bounding boxes and identifying those bounding boxes based on the greatest overlap of pixel analysis.

In the example illustrated, the key information may be indicated with a dotted line box, while value information may be identified with a solid line box. However, the difference between solid and dotted line as provided for illustrative purposes, and in other embodiments, FPAS 102 may include any designations to differentiate between key objects and value objects identified within an image 108. For example, the key and value boxes may be indicated with different colors or other visual cues.

As illustrated, form 400 may also include text such as "Please fill out this form" that may be identified as FPAS 102 as being neither a key nor a value object, and thus is disregarded as background.

In an embodiment, FPAS 102 may use various optical cues to differentiate between keys and values as illustrated in form 400. For example, some value information may be written with or within a line of horizontal boxes. For example, the value "Max" may be written within the line of horizontal boxes that are provided for someone to under their first name. Other value information may exist inside of a fully enclosed circle or square (such as the "X"), or may be written above a horizontal line (such as date and signature value information).

As noted above, BBE 112 may identify or generate locational values, for at least a subset of pixels of image 108 (as illustrated in FIG. 3). The locational value information may indicate a format of a form or a relative position or layout of those pixels of an image 108 to corresponding identified or predicted bounding boxes for identified key and/or value objects or sub-images.

In an embodiment, the float mask or locational values generated by BBE 112 for each key or value pixel may include: offset_x, offset_y, size_x, size_y, offset_to_key_x, and offset_to_key_y.

The first offset value pair (offset_x, offset_y) may indicate a horizontal and vertical distance from a center of a bounding box in which the particular pixel is located, regardless of whether it is a key or value pixel. The second pair of values (size_x, size_y) may indicate a length and width of the bounding box in which the pixel is located. The second offset pair (offset_to_key_x, offset_to_key_y) may indicate a horizontal and vertical distance from a center (or approximated center) of a corresponding key bounding box. In an embodiment, for key pixels, the first offset value and second offset value may be identical.

In an embodiment, the offset values may include both horizontal and vertical offset values indicating a distance from a predicted center of a predicted bounding box for the key information. The size values may include length and width sizes (in pixels) of the bounding box for the key information.

In an embodiment, BBE 112 may generate all six values for value pixels, and four values (offset_x, offset_y, size_x, size_y) key pixels. For key pixels, the first and second offset pairs may be identical values, and as such the second offset values may be discarded, disregarded, or not generated. In another embodiment, the first and second offset pairs may be different values, and the second offset values may still be discarded.

In another embodiment, BBE 112 may generate or maintain six values for both key pixels and value pixels to simplify the architecture of the system. However, as noted above, for key pixels, the last two offset values may be identical to the first two offset values (since there is no other bounding box for key pixels). This identical offset pair value information may indicate to FPAS 102 which pixels are key pixels and which pixels are value pixels.

Using the classification and/or locational value information, FPAS 102 may generate one or more key-value pairs 120 to output in an output form 106. In an embodiment, key-value pair 120 may be the objects or sub-images extracted from image 108 and copied or pasted to an output form 106 in a new or different format. In another embodiment, output form 106 may include pairwise references to different areas in the input form, which may be arranged as pixel coordinates indicating the corners or dimensions and placement of the value and corresponding key boxes, or other structural representations. In an embodiment, output form 106 may be generated with various key-value pairs 120 without performing any textual or OCR analysis and thus may work across any languages.

Figure 5:
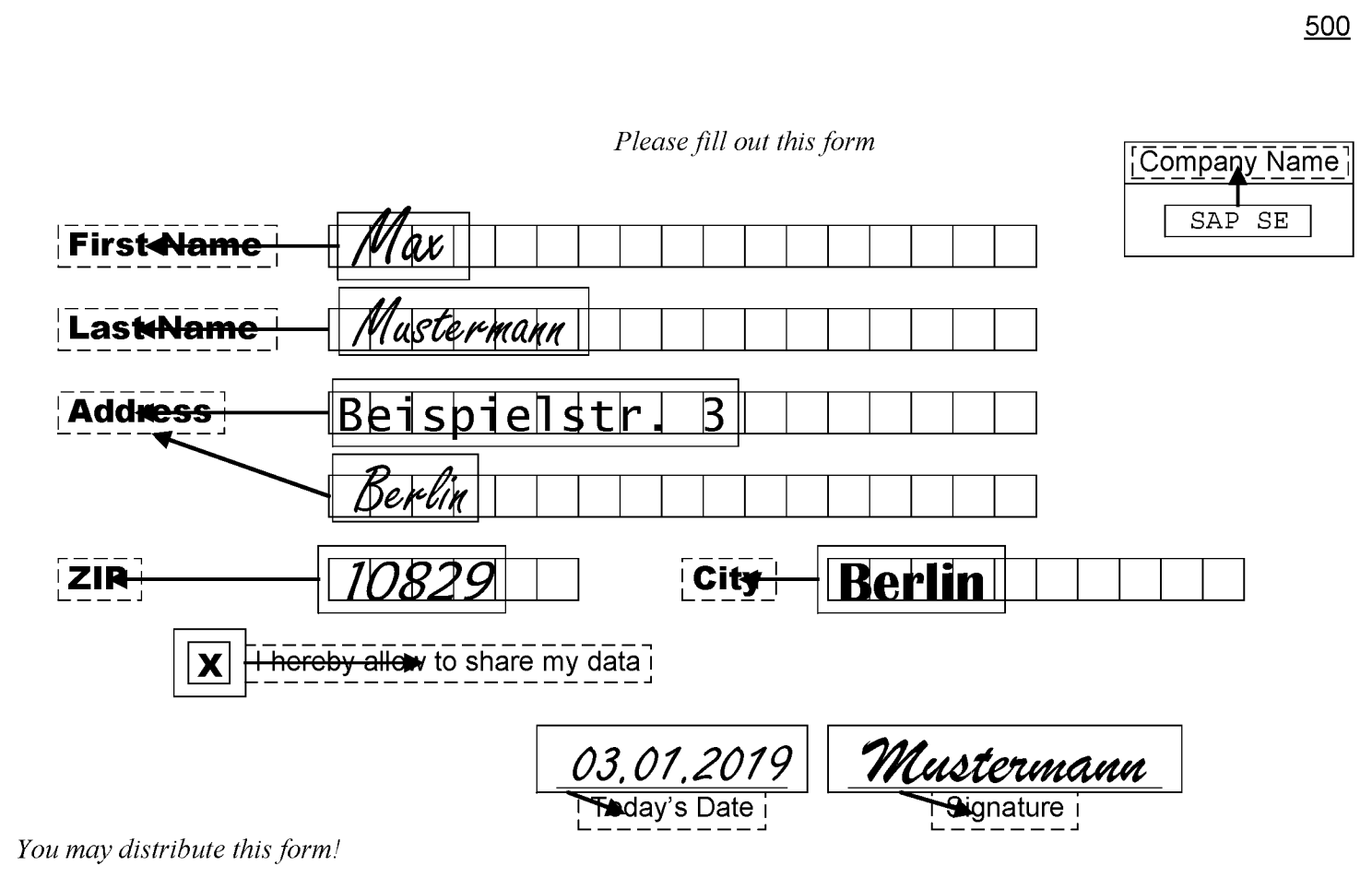

FIG. 5 is a block diagram illustrating examples associations between key information and value information of an output form 500, according to some example embodiments. Form 500 may be an example of an output form 106 that is generated by FPAS 102. Based on geographical or optical proximity of the various bounding boxes, FPAS 102 may indicate or generate or predict associations between the identified value information (value bounding boxes) and the identified key information (key bounding boxes). The arrows indicate example associations or predications of key-value pairs 120. In an embodiment, the arrows may point from the values to the center of the key bounding boxes. In another embodiment, the arrows may not be provided on form 500. Output form 500 is also an example of training data 118 that may be used to train neural network 116.

Returning to FIG. 1, an OCR engine 114 may perform OCR (optical character recognition) analysis on the text of the key objects and/or value objects identified by FPAS 102. In an embodiment, FPAS 102 may either reformat and output the information with the predicated associations, or may be perform OCR processing on the text of the key objects and value objects, and may perform additional textual processing on the OCR generated text.

OCR engine 114 may identify the various text, letters, words, numbers, symbols, punctuation, identified as being either key information or value information from image 108. In an embodiment, a user may specify a particular language in which to use OCR engine 114, or FPAS 102 may try various OCR engines 114 configured for different languages to perform OCR processing until one of the OCR engines 114 is able to identify the languages of the key and/or values of forms 104A, 104B. Then, for example, the output form 106 may include writing the OCR processed textual values to a spreadsheet, database, or other document. For example, in an embodiment, FPAS 102 may output (as output form) a spreadsheet with key information down the rows of one column and value information down the rows of a second column.

In an embodiment, FPAS 102 may receive images 108 of a variety of different and unknown forms, across a variety of different languages, and may output 106 all the various names and zip codes identified across all the forms without the use of templates or manual processing.

Figure 6:
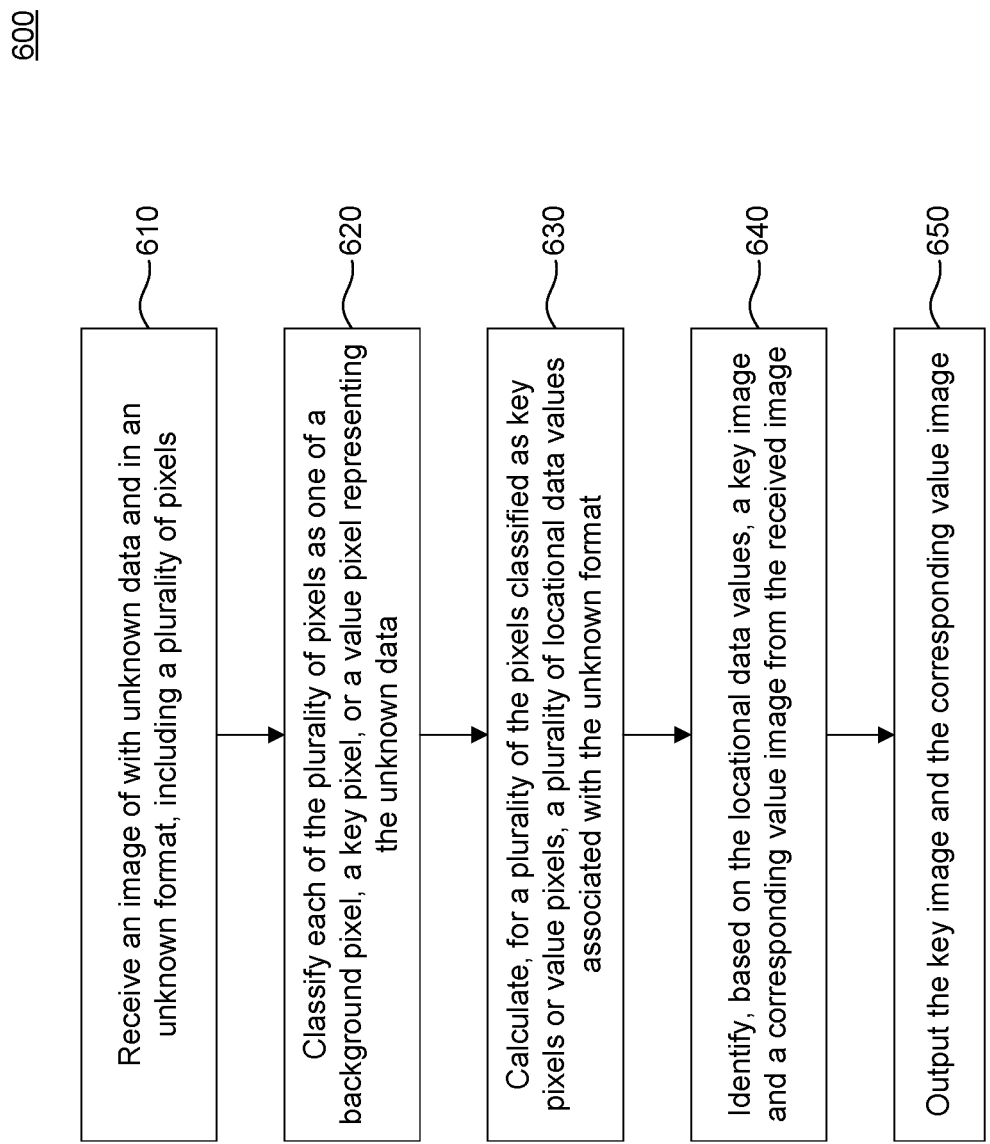
FIG. 6 is a flowchart illustrating example operations for providing a form processing and analysis system, according to some embodiments.

FIG. 6 is a flowchart 600 illustrating example operations for providing a form processing and analysis system, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to the figures.

In 610, an image of a form of an unknown format is received. For example, FPAS 102 may receive an image 108 of an input form 104A. FPAS 102 may also receive additional images 108 of various other input forms 104B. In an embodiment, the image 108 may be for a form with an unknown amount or quality of data arranged in an unknown format, in one or more unknown languages. As illustrated in FIG. 3, the input form image 108 may include or comprise various pixels upon which pixel analysis may be performed by FPAS 102.

In 620, each of the plurality of pixels is classified as one of a background pixel, a key pixel, or a value pixel representing the unknown data. For example, a classifier 110 may classify or categorize each pixel of image 108 as being one of a background image (without key or value information) or being associated with either key information or value information.

In 630, a plurality of locational data values associated with the unknown format is calculated for a plurality of the pixels classified as key pixels or value pixels. For example, BBE 112 may generate a float mask of locational data values for a subset of the pixels, particularly for key and value pixels. In another embodiment, the locational data values for all the pixels, including background pixels may be calculated.

The locational data values may include offset information indicating a distance to the center of an associated or closest or predicted key bounding box and/or the center of an associated or closest or predicted value bounding box. The locational data values may also include size values for the bounding box in which the pixel is located. In an embodiment, FPAS 102 may not generate locational information for border pixels, near the edge of a bounding box or may otherwise weigh that information less than locational information for more centrally located pixels.

In 640, a key image and a corresponding value image from the received image is identified based on the locational data values. For example, as illustrated in FIGS. 4 and 5, bounding box information for both key images and value images may be identified, and associations may be generated between the various key-value pairs 120.

In 650, the key image and the corresponding value image are output. For example, FPAS 102 may output the various key images and associated value images, or may perform OCR processing on the images, identify text, and perform further content-based textual analysis on the identified letters, words, symbols, or characters within the key images or value images.

Figure 7:
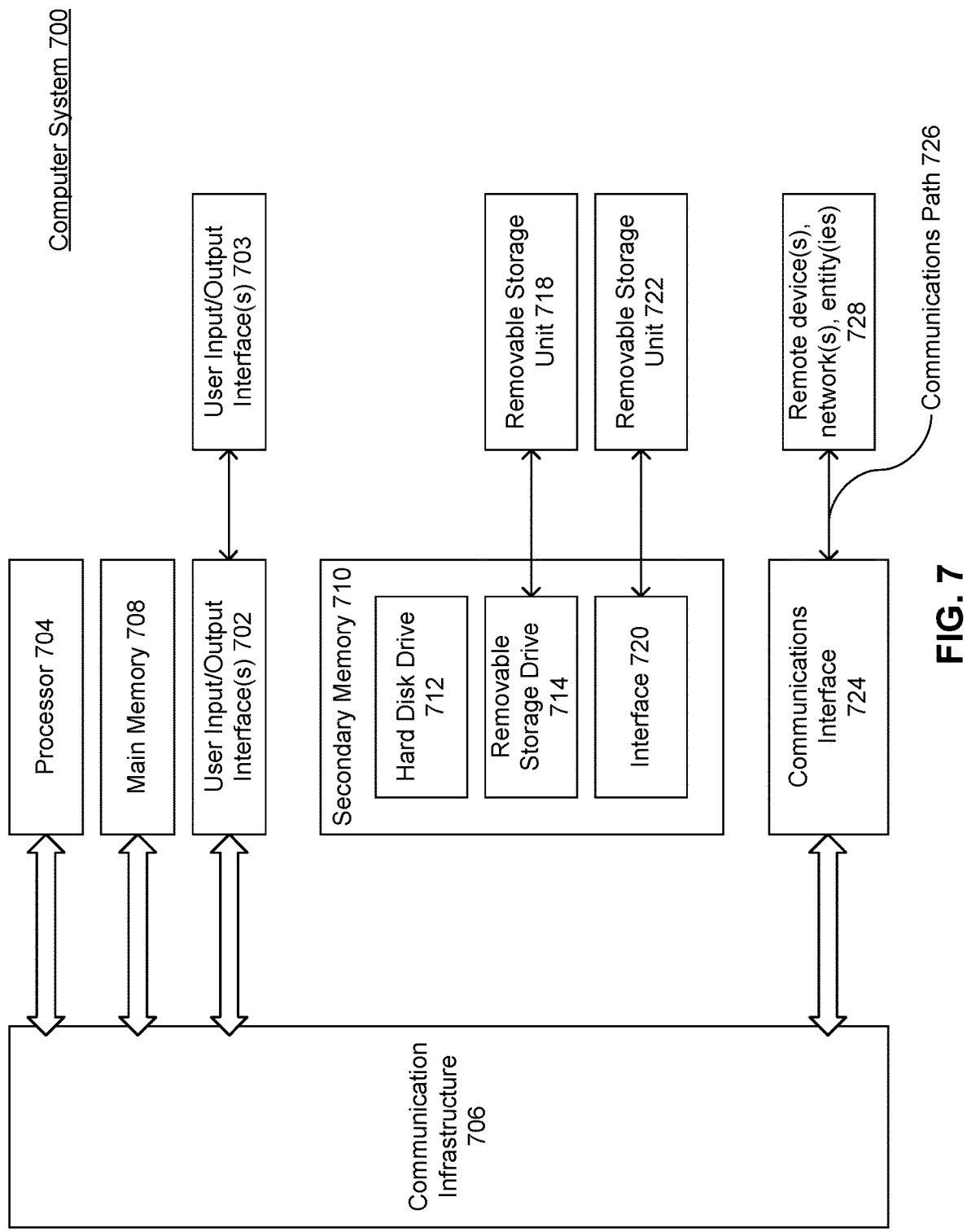
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include customer input/output device(s) 703, such as monitors, keyboards, pointing devices, etc., which may communicate with communication infrastructure 706 through customer input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving an image of a form of an unknown format, wherein the form includes a plurality of unknown data, and wherein the image comprises a plurality of pixels representing the unknown data in the unknown format;
classifying each of the plurality of pixels as one of a background pixel, a key pixel, or a value pixel representing the unknown data based on a predicted bounding box, wherein at least one of the plurality of pixels is classified in each classification of background pixel, key pixel, and value pixel;

calculating, for a plurality of the pixels classified as key pixels or value pixels, a plurality of locational data values associated with the unknown format;

identifying, based on the plurality of locational data values, a key image and a corresponding value image from the received image; and outputting the key image and the corresponding value image.

2. The method of claim 1, wherein the unknown data is in an unknown language.

3. The method of claim 2, wherein the outputting comprises:

identifying the unknown language;

performing optical character recognition on the key image and the value image using the identified language; and outputting text corresponding to the key image and the value image in the identified language based on the optical character recognition.

4. The method of claim 1, wherein the plurality of locational data values for the key pixels comprise two values corresponding to a horizontal offset value and a vertical offset value indicating a location of the pixel relative to a center of the predicted bounding box for corresponding the value image.

5. The method of claim 4, wherein the plurality of locational data values for the key pixels comprise two more values corresponding to a size of the predicted bounding box, wherein the size includes both a length value and a width value.

6. The method of claim 5, wherein the plurality of locational data values for the value pixels comprise the plurality of locational data values for the key pixels and two additional offset values indicating a location of the value pixel relative to a center of the predicted bound box for the corresponding key image.

7. The method of claim 1, wherein the classifying is based on identifying optical cues identified within the image.

8. The method of claim 7, wherein the classifying is performed by a neural network which has been trained using a set of training data identifying various key-value pairs from a plurality of different forms in a variety of different formats.

9. The method of claim 1, wherein the key pixel indicates a pixel that corresponds to key information of a form, and wherein the value pixel indicates a pixel that indicates filled-in value information of the form associated with the key information.

10. A system, comprising:

a memory; and at least one processor coupled to the memory and configured to perform instructions that cause the at least one processor to perform operations comprising:

receiving an image of a form of an unknown format, wherein the form includes a plurality of unknown data, and wherein the image comprises a plurality of pixels representing the unknown data in the unknown format;

classifying each of the plurality of pixels as one of a background pixel, a key pixel, or a value pixel representing the unknown data based on a predicted bounding box, wherein at least one of the plurality of pixels is classified in each classification of background pixel, key pixel, and value pixel;

calculating, for a plurality of the pixels classified as key pixels or value pixels, a plurality of locational data values associated with the unknown format;

identifying, based on the plurality of locational data values, a key image and a corresponding value image from the received image; and outputting the key image and the corresponding value image.

11. The system of claim 10, wherein the unknown data is in an unknown language.

12. The system of claim 11, wherein the outputting comprises:

identifying the unknown language;

performing optical character recognition on the key image and the value image using the identified language; and outputting text corresponding to the key image and the value image in the identified language based on the optical character recognition.

13. The system of claim 10, wherein the plurality of locational data values for the key pixels comprise two values corresponding to a horizontal offset value and a vertical offset value indicating a location of the pixel relative to a center of the predicted bounding box for corresponding the value image.

14. The system of claim 13, wherein the plurality of locational data values for the key pixels comprise two more values corresponding to a size of the predicted bounding box, wherein the size includes both a length value and a width value.

15. The system of claim 14, wherein the plurality of locational data values for the value pixels comprise the plurality of locational data values for the key pixels and two additional offset values indicating a location of the value pixel relative to a center of the predicted bound box for the corresponding key image.

16. The system of claim 10, wherein the classifying is based on identifying optical cues identified within the image.

17. The system of claim 16, wherein the classifying is performed by a neural network which has been trained using a set of training data identifying various key-value pairs from a plurality of different forms in a variety of different formats.

18. A non-transitory computer-readable device having instructions stored thereon that, when executed by at least one computing device, cause the at least one computing device to perform operations comprising:

receiving an image of a form of an unknown format, wherein the form includes a plurality of unknown data, and wherein the image comprises a plurality of pixels representing the unknown data in the unknown format;

classifying each of the plurality of pixels as one of a background pixel, a key pixel, or a value pixel representing the unknown data based on a predicted bounding box, wherein at least one of the plurality of pixels is classified in each classification of background pixel, key pixel, and value pixel;

calculating, for a plurality of the pixels classified as key pixels or value pixels, a plurality of locational data values associated with the unknown format;

identifying, based on the plurality of locational data values, a key image and a corresponding value image from the received image; and outputting the key image and the corresponding value image.

19. The device of claim 18, wherein the outputting comprises:

identifying a language of the unknown data;

performing optical character recognition on the key image and the value image using the identified language; and outputting text corresponding to the key image and the value image in the identified language based on the optical character recognition.

20. The device of claim 18, wherein the plurality of locational data values for the key pixels comprise two values corresponding to a horizontal offset value and a vertical offset value indicating a location of the pixel relative to a center of the predicted bounding box for the corresponding value image.

* * * * *